United States Patent
Hosaka

(10) Patent No.: US 10,940,586 B2
(45) Date of Patent: Mar. 9, 2021

(54) METHOD FOR CORRECTING TARGET POSITION OF WORK ROBOT

(71) Applicant: FUJI CORPORATION, Chiryu (JP)

(72) Inventor: Hideki Hosaka, Anjo (JP)

(73) Assignee: FUJI CORPORATION, Chiryu (JP)

( * ) Notice: Subject to any disclaimer, the term of this patent is extended or adjusted under 35 U.S.C. 154(b) by 106 days.

(21) Appl. No.: 16/466,072

(22) PCT Filed: Dec. 13, 2016

(86) PCT No.: PCT/JP2016/087024
§ 371 (c)(1),
(2) Date: Jun. 3, 2019

(87) PCT Pub. No.: WO2018/109828
PCT Pub. Date: Jun. 21, 2018

(65) Prior Publication Data
US 2020/0061812 A1 Feb. 27, 2020

(51) Int. Cl.
*B25J 9/16* (2006.01)
*B25J 9/10* (2006.01)

(52) U.S. Cl.
CPC ............ *B25J 9/163* (2013.01); *B25J 9/1005* (2013.01)

(58) Field of Classification Search
CPC ........ B25J 9/163; B25J 9/1005; B25J 9/1664; B25J 9/10; G05B 2219/36504; G05B 2219/36416; G05B 19/4083
USPC .................................................. 700/245, 251
See application file for complete search history.

(56) References Cited

U.S. PATENT DOCUMENTS

| | | | | |
|---|---|---|---|---|
| 4,613,943 A | * | 9/1986 | Miyake | B23K 9/12 318/568.2 |
| 5,418,441 A | * | 5/1995 | Furukawa | B25J 9/1641 318/568.22 |
| 5,590,244 A | * | 12/1996 | Nakata | B25J 9/1684 318/578 |
| 5,668,930 A | * | 9/1997 | Hamura | G05B 19/425 700/252 |

(Continued)

FOREIGN PATENT DOCUMENTS

JP  2009-148850 A  7/2009

OTHER PUBLICATIONS

International Search Report dated Feb. 28, 2017, in PCT/JP2016/087024 filed on Dec. 13, 2016.

*Primary Examiner* — Jaime Figueroa
(74) *Attorney, Agent, or Firm* — Oblon, McClelland, Maier & Neustadt, L.L.P.

(57) ABSTRACT

In a method for correcting a target position, a three-dimensional matrix is formed by piling up, in a Z-direction at predetermined intervals, matrix planes each formed by continuously connecting, in X- and Y-directions, quadrangular areas that are parallel to an XY-plane and each have a reference point, and a target position of a work robot designated in an operation space of the three-dimensional matrix is corrected. In this method, a first block and a second block are set which are individually contiguous with the specific block, and the target position is corrected based on respective reference points in the upper area and the lower area of the specific block, the first block, and the second block and the measured deviation amount of the work robot from the reference points.

6 Claims, 11 Drawing Sheets

(56) References Cited

U.S. PATENT DOCUMENTS

| | | | | |
|---|---|---|---|---|
| 6,124,693 A * | 9/2000 | Okanda | ............... | G05B 19/4086 |
| | | | | 318/564 |
| 6,826,450 B2 * | 11/2004 | Watanabe | ............... | B25J 9/1638 |
| | | | | 219/124.34 |
| 9,669,545 B2 * | 6/2017 | Suzuki | ................... | B25J 9/1697 |
| 10,279,479 B2 * | 5/2019 | Suzuki | ................... | B25J 9/1692 |
| 2002/0173878 A1 * | 11/2002 | Watanabe | ............... | B25J 9/1638 |
| | | | | 700/245 |
| 2008/0250636 A1 * | 10/2008 | Okuda | ................ | H05K 13/041 |
| | | | | 29/834 |
| 2010/0161125 A1 * | 6/2010 | Aoba | ....................... | G06T 1/00 |
| | | | | 700/254 |
| 2010/0207567 A1 * | 8/2010 | Mori | ..................... | B23Q 17/22 |
| | | | | 318/632 |
| 2010/0244762 A1 * | 9/2010 | Mori | ..................... | B23Q 17/22 |
| | | | | 318/632 |
| 2014/0229005 A1 * | 8/2014 | Suzuki | ................... | B25J 9/1697 |
| | | | | 700/254 |
| 2014/0277715 A1 * | 9/2014 | Nagai | ...................... | B25J 21/00 |
| | | | | 700/248 |
| 2015/0088311 A1 * | 3/2015 | Suzuki | ................... | B25J 9/1692 |
| | | | | 700/254 |
| 2015/0158176 A1 * | 6/2015 | Fujita | ................ | H05K 13/0812 |
| | | | | 700/97 |
| 2016/0354929 A1 * | 12/2016 | Ishige | ................... | B25J 9/1692 |
| 2018/0236669 A1 * | 8/2018 | Fukuda | ..................... | G06T 7/74 |
| 2018/0243911 A1 * | 8/2018 | Harada | ................... | B25J 9/1697 |
| 2018/0300901 A1 * | 10/2018 | Wakai | ....................... | G06T 7/73 |
| 2018/0345490 A1 * | 12/2018 | Matsushima | ............ | B25J 13/06 |
| 2018/0345493 A1 * | 12/2018 | Kokubo | ................ | B25J 9/1653 |
| 2019/0030722 A1 * | 1/2019 | Yamaguchi | ............ | B25J 9/1664 |
| 2020/0189108 A1 * | 6/2020 | Suzuki | ................... | B25J 9/161 |

* cited by examiner

METHOD FOR CORRECTING TARGET POSITION OF WORK ROBOT

TECHNICAL FIELD

The present description discloses a method for correcting a target position of a work robot.

BACKGROUND ART

As work robots, there have conventionally been proposed work robots in which the operation of a work robot is controlled by performing a coordinate transformation through application of a DH parameter to a target point (for instance, refer to Patent Literature 1). DH parameter are set as follows. That is, a control device of a robot divides an operation space for the robot into multiple regions and sets a measurement point for each of the divided regions. Next, the control device moves the robot to the measurement points to acquire three-dimensional position data. Then, the control device derives a DH parameter from an error between the acquired position data and the measurement point. In controlling the operation of the robot based on the target point, the control device selects, in DH parameters derived individually for the multiple regions, a DH parameter of the region involving the target point and performs a coordinate transformation by applying the selected DH parameter to the target point.

PATENT LITERATURES

Patent Literature 1: JP-A-2009-148850

BRIEF SUMMARY

Technical Problem

In the work robot described above, however, even though the DH parameter used for the coordinate transformation is optimized, the working accuracy cannot be ensured sufficiently in some cases. Therefore, it is desired to further improve the working efficiency of such work robots.

An object of the present disclosure is to position a work robot in a target position designated in an operation space of a three-dimensional matrix with good accuracy.

Solution to Problem

According to the present disclosure, there is provided a method for correcting a target position of a work robot in which with a left-right direction referred to as an X-axis, a front-rear direction referred to as a Y-axis, and an up-down direction referred to as a Z-axis, matrix planes each formed by continuously connecting, together in X- and Y-directions, quadrangular areas being parallel to an XY-plane and each having a reference point are piled up one on another at predetermined intervals in a Z-direction to thereby build up a three-dimensional matrix, and a target position of the work robot designated in an operation space of the three-dimensional matrix is corrected, a rectangular parallelepiped space, with including an upper and lower pair of the areas disposed at the predetermined intervals, being referred to as a block, and a block, with including the target position designated in the operation space of the three-dimensional matrix, being referred to as a specific block, the method comprising: (a) a step of setting two blocks contiguous with the specific block as a first block and a second block; and (b) a step of correcting the target position based on respective reference points in an upper area and a lower area of the specific block and a measured deviation amount of the work robot from the reference points, respective reference points in an upper area and a lower area of the first block and a measured deviation amount of the work robot from the reference points, and respective reference points in an upper area and a lower arear of the second block and a measured deviation amount of the work robot from the reference points.

In this target position correcting method, the two blocks contiguous with the specific block including the target position are set as the first block and the second block. Then, the target position is corrected based on the respective reference points in the upper arear and the lower area of the specific block and the measured deviation amount of the work robot from the reference points, the respective reference points in the upper area and the lower area of the first block and the measured deviation amount of the work robot from the reference points, and the respective reference points in the upper area and the lower area of the second block and the measured deviation amount of the work robot from the reference points. In this manner, the target position is corrected by making use of not only the measured deviation amount from the reference points of the specific block but also the measured deviation amount from the reference points of the two blocks that are contiguous with the specific block. Consequently, the work robot can be positioned in the target position designated in the operation space of the three-dimensional matrix with good accuracy.

DESCRIPTION OF EMBODIMENTS

Next, embodiments of the present disclosure will be described with reference to the drawings.

Figure 1:
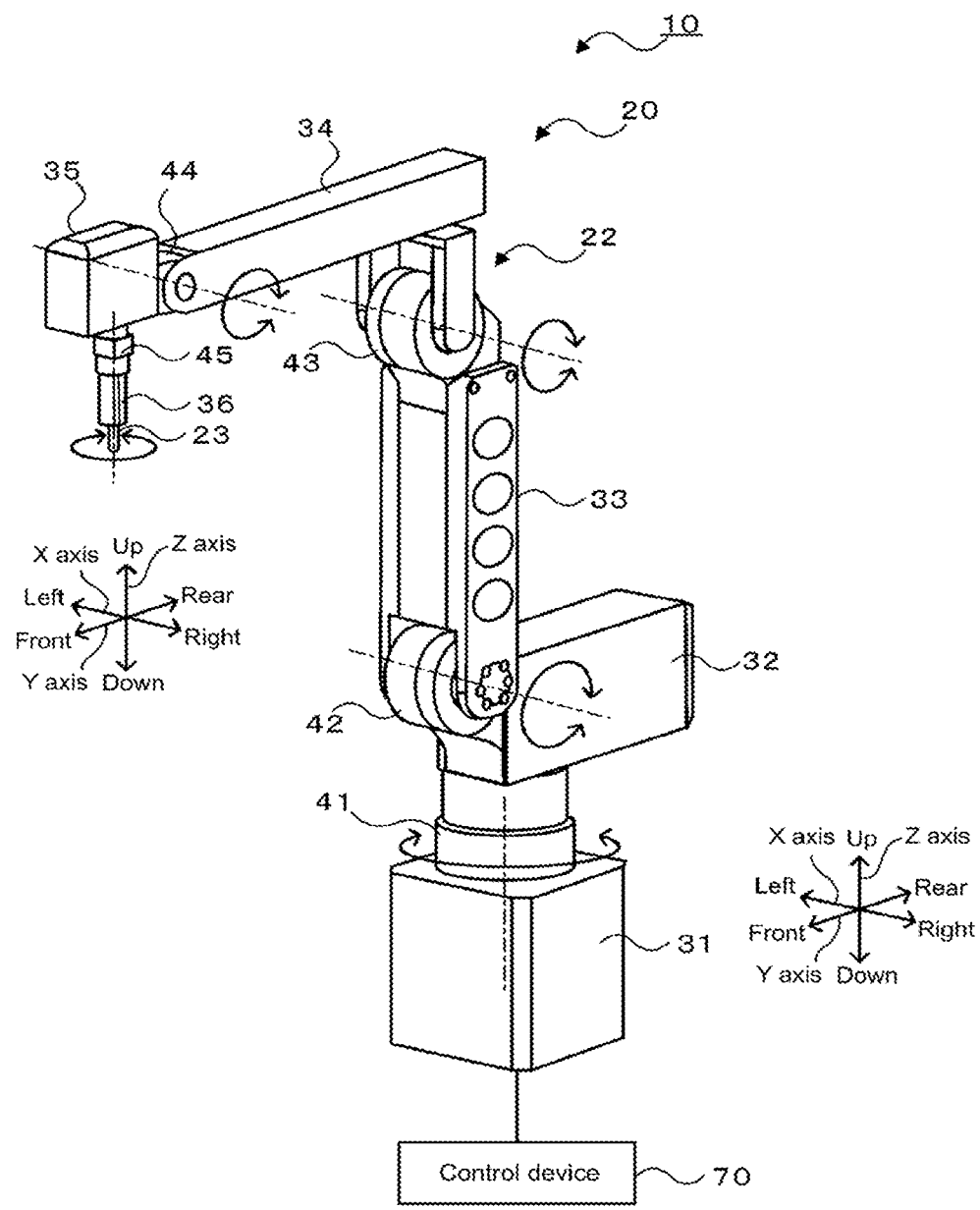
FIG. 1 is a block diagram illustrating a schematic configuration of robot system 10.
Figure 2:
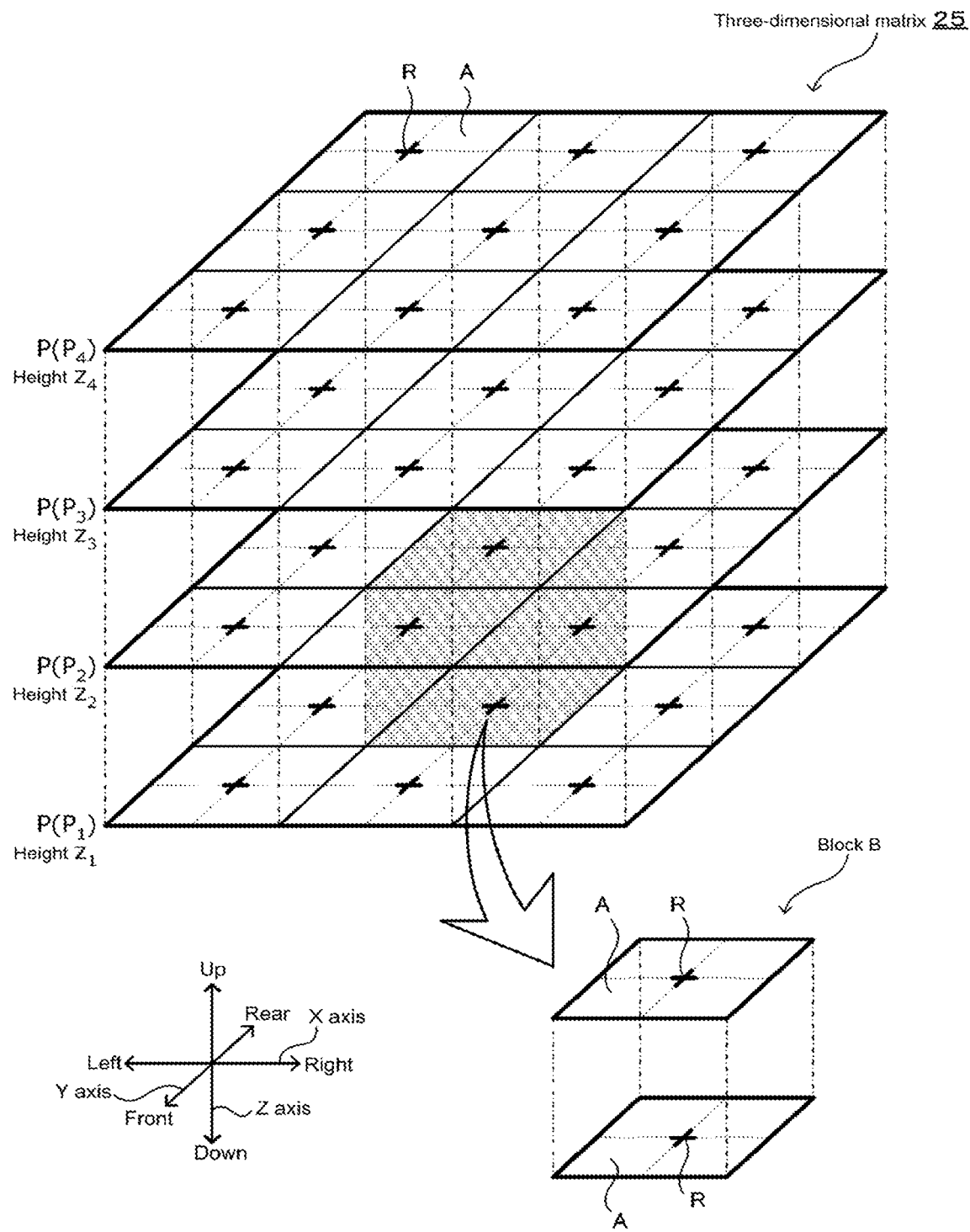
FIG. 2 illustrates three-dimensional matrix 25.
Figure 3:
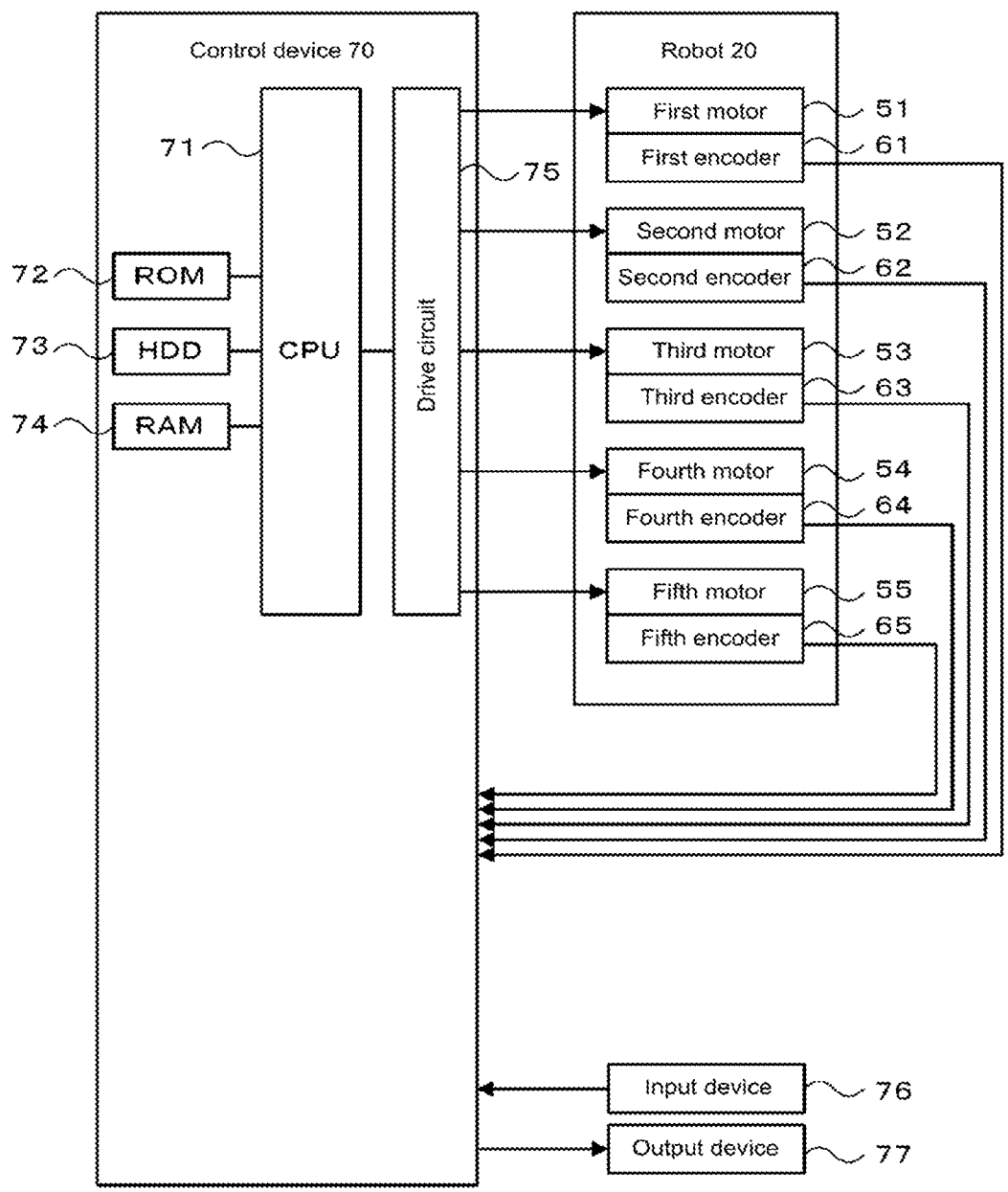
FIG. 3 is a block diagram illustrating an electrical connection relationship between robot 20 and control device 70.

FIG. 1 is a block diagram illustrating a schematic configuration of robot system 10. FIG. 2 illustrates three-dimensional matrix 25. FIG. 3 is a block diagram illustrating an electrical connection relationship between robot 20 and control device 70. In FIGS. 1, 2, a left-right direction is referred to as an X-axis direction, a front-rear direction is referred to as a Y-axis direction, and an up-down direction is referred to as a Z-axis direction.

Robot system 10 includes robot 20 and control device 70 configured to control robot 20. Robot system 10 constitutes a system configured to pick up a workpiece and place the workpiece picked up on a target object. In this embodiment, robot system 10 can be applied to any system, provided that the system is such that a workpiece is handled using robot 20. For example, robot system 10 can be applied to a component mounting system in which robot 20 picks up components and mounts them on a board.

Robot 20 includes a five-axis vertical articulated arm (hereinafter, referred to as an arm) 22 and end effector 23, not shown, which constitutes a hand of robot 20. Arm 22 includes six links (first to sixth links 31 to 36) and five joints (first to fifth joints 41 to 45) which couple the links so as to rotate or swing. The individual joints (first to fifth joints 41 to 45) include motors (first to fifth motors 51 to 55, refer to FIG. 3) configured to drive the corresponding joints and encoders (first to fifth encoders 61. to 65) configured to detect a rotation angle of the corresponding motors. In this embodiment, the motors are servomotors, and the encoders are rotary encoders. End effector 23 is attached to a distal end link (sixth link 36) of arm 22 and can hold and release a component (workpiece). For example, a mechanical chuck, a suction nozzle, an electromagnet, and the like can be used for the end effector 23.

Here, an operation space of robot 20 will be described by reference to FIG. 2. Three-dimensional matrix 25 constitutes an operation space for robot 20. Once a target position is set within three-dimensional matrix 25, a distal end of end effector 23 of robot 20 is moved to the target position by control device 70, which will be described in detail later. Three-dimensional matrix 25 is fabricated by piling up matrix planes P at predetermined intervals in a Z-direction. Nth matrix plane P from a bottom of three-dimensional matrix 25 is referred to as matrix plane $P_n$ (n is a natural number). A height or z-coordinate of matrix plan $P_n$ is denoted by $z_n$. Matrix plane P is made by continuously connecting together multiple rectangular areas A, which are parallel to an XY-plane and each have a reference point R at a center thereof, in XY-directions. Reference point R is set on world coordinates (absolute coordinates). Coordinates of all reference points R are stored in HDD 73 in advance. In this embodiment, a rectangular parallelepiped space including a pair of upper and lower areas A disposed at a predetermined interval is referred to as block B.

As illustrated in FIG. 3, control device 70 is configured as a microprocessor mainly made up of CPU 71 and includes, in addition to CPU 71, ROM 72, HDD 73, RAM 74, drive circuit 75, and the like. Drive circuit 75 drives first to fifth motors 51 to 55. Signals are input into control device 70 from first to fifth encoders 61 to 65, input device 76, and the like. Signals are output from control device 70 to output device 77 and first to fifth motors 51 to 55. Input device 76 is an input device on which an operator performs an input operation. Output device 77 is a display device configured to display various types of information thereon.

Figure 4:
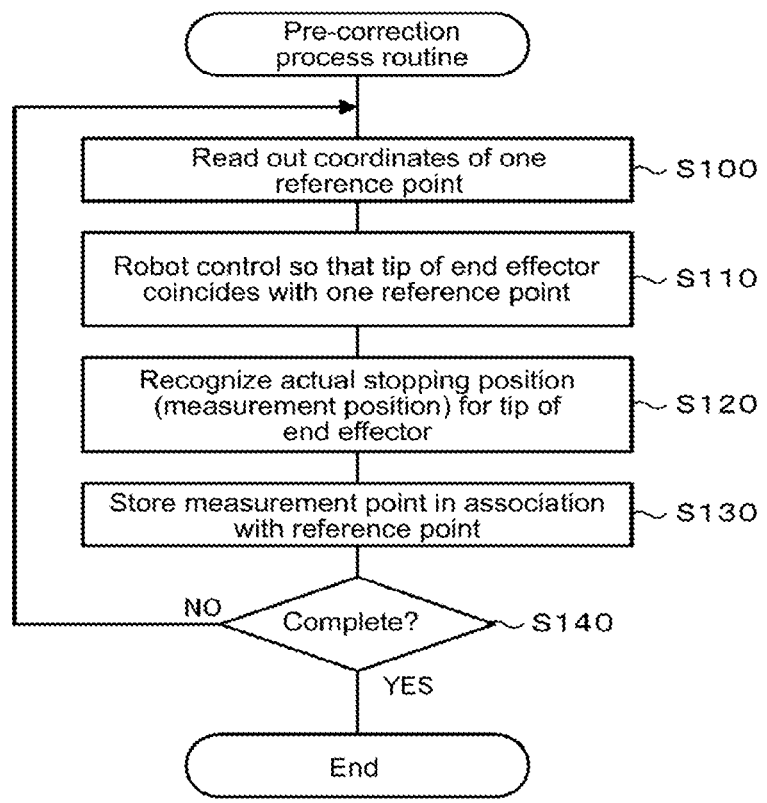
FIG. 4 is a flowchart of a pre-correction process routine.
Figure 6:
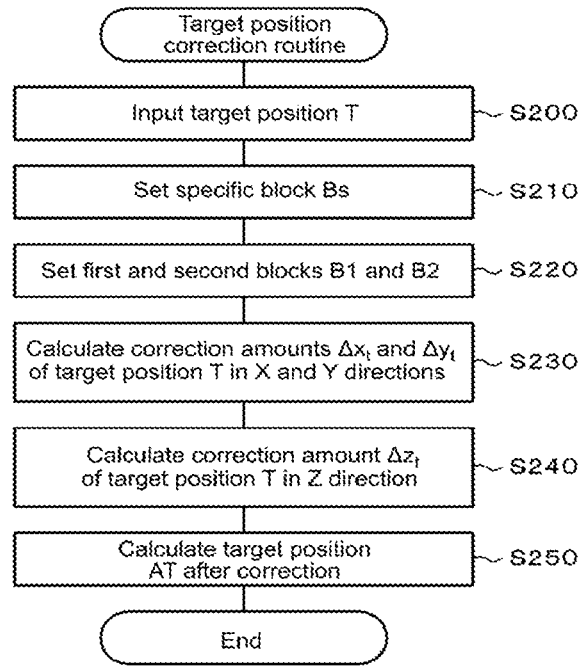
FIG. 6 is a flowchart of a target position correction routine.

Next, the operation of robot system 10 will be described. FIG. 6 is a flowchart of a target position correction routine. Robot system 10 executes a pre-correction process routine before robot system 10 executes the target position correction routine, and therefore, firstly, the pre-correction process routine will be described, whereafter the target position correction routine will be described. FIG. 4 is a flowchart of the pre-correction process routine.

When the pre-correction process routine is started, CPU71 of control device 70 reads out coordinates of one reference point R (S100) and controls robot 20 so that the distal end of end effector 23 of robot 20 coincides with the coordinates (S110). Next, CPU 71 recognizes an actual stopping position then of the distal end of end effector 23 on the world coordinates (S120) and stores the stopping position as a measurement point M in HDD 73 in association with current reference point R (S130). Then, CPU 71 determines whether the pre-correction process routine ends, that is, determines whether measurement points M are stored while being individually associated with all reference points R (S140). If the determination result is negative, CPU 71 returns to S100 to execute a similar process on next reference point R. On the other hand, if the result of the determination is affirmative, CPU71 ends this pre-correction process routine.

Figure 5:
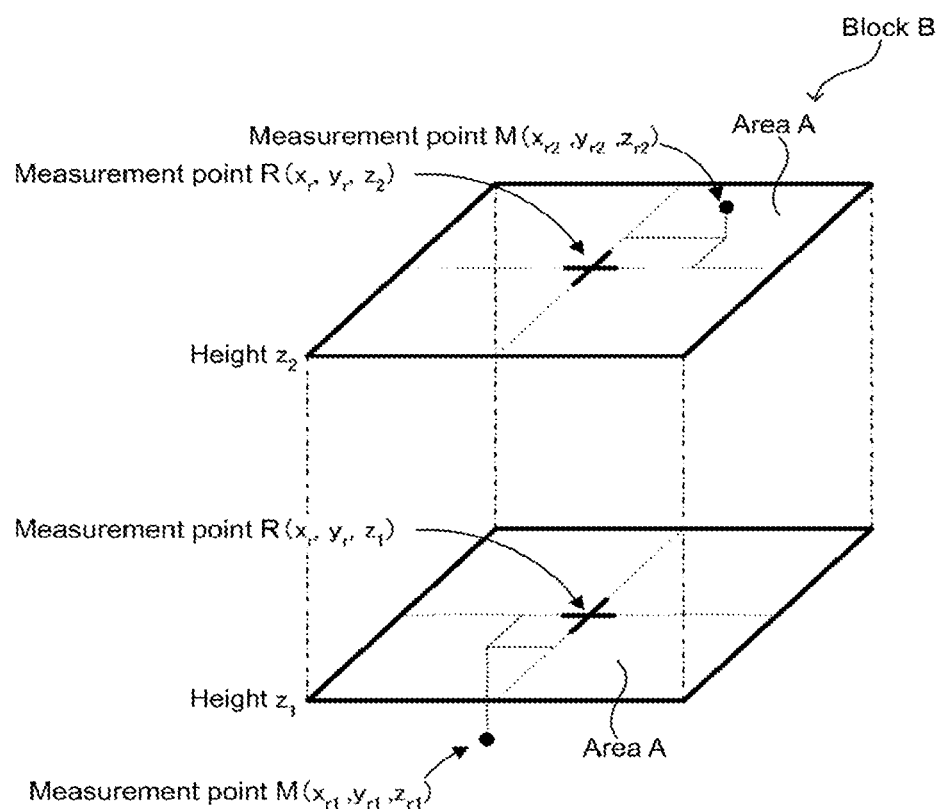
FIG. 5 illustrates a relationship between reference point R and measurement point M.

Here, an example of a relationship between reference point R and measurement point M will be described by reference to FIG. 5. FIG. 5 is an explanatory diagram illustrating a relationship between reference point R and measurement point M of block B where area A at height z1 and area A at height z2 make a pair of upper and lower areas. In area A at height z1, reference point R is $(x_r, y_r, z_1)$, and measurement point M is $(x_{r1}, y_{r1}, z_{r1})$, and in area A at height z2, reference point R is $(x_r, y_r, z_2)$, and measurement point M is $(x_{r2}, y_{r2}, z_{r2})$.

Next, referring to FIG. 6, the target position correction routine will be described. The target position correction routine is a correction routine in which target position T input into robot 20 is corrected for the distal end of end effector 23 to be positioned in target portion T with good accuracy.

When the target position correction routine is started, firstly, CPU 71 reads out coordinates $(x_t, y_t, z_t)$ of current target position (S200). The coordinates $(x_t, y_t, z_t)$ of target position T are input into robot 20 in advance by an operator via input device 76 and are stored in HDD 73. Next, CPU71 sets specific block Bs (S210). Specifically, block B including target position T on the world coordinates is set as specific block Bs.

Figure 7A:
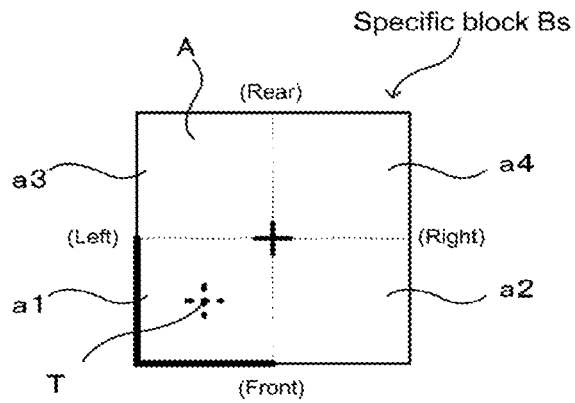
FIG. 7A is a top view of specific block Bs with target position T residing in left front zone a1.
Figure 7B:
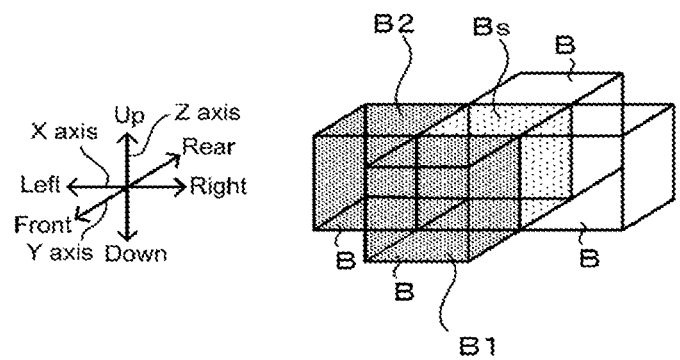
FIG. 7B illustrates first and second blocks B1, B2 with target position T residing in left front zone a1.
Figure 8A:
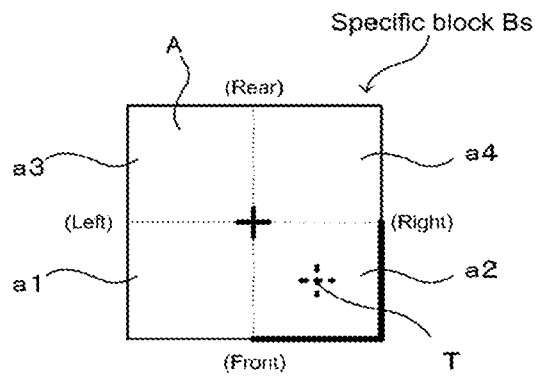
FIG. 8A is a top view of specific block Bs with target position T residing in right front zone a2.
Figure 8B:
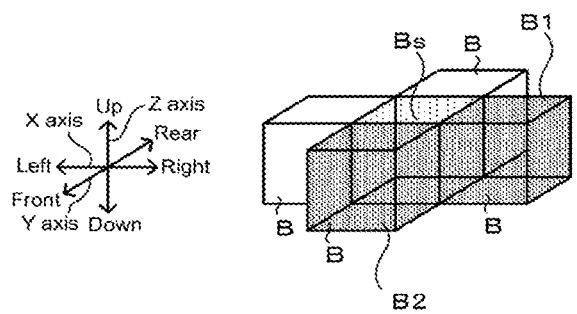
FIG. 8B illustrates first and second blocks B1 and B2 with target position T residing in right front zone a2.
Figure 9A:
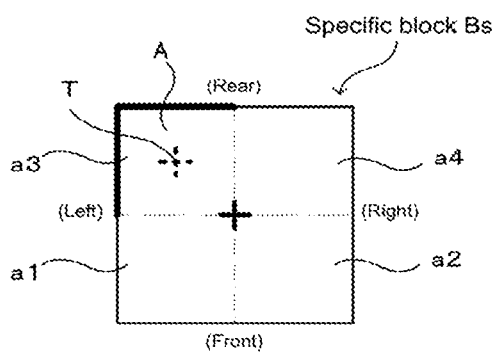
FIG. 9A is a top view of specific block Bs with target position T residing in left rear zone a3.
Figure 9B:
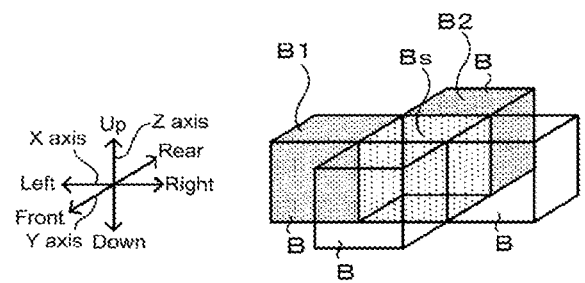
FIG. 9B illustrates first and second blocks B1 and B2 with target position residing in left rear zone a3.
Figure 10A:
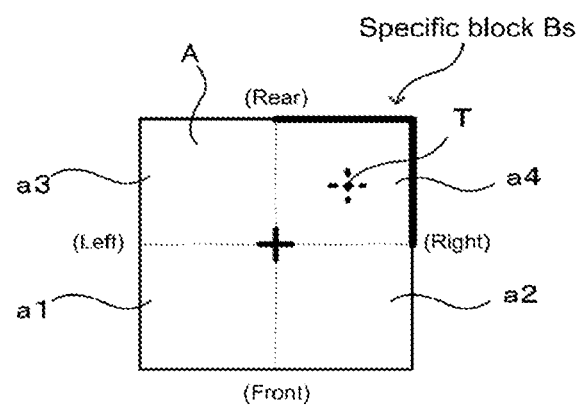
FIG. 10A is a top view of specific block Bs with target position T residing in right rear zone a4.
Figure 10B:
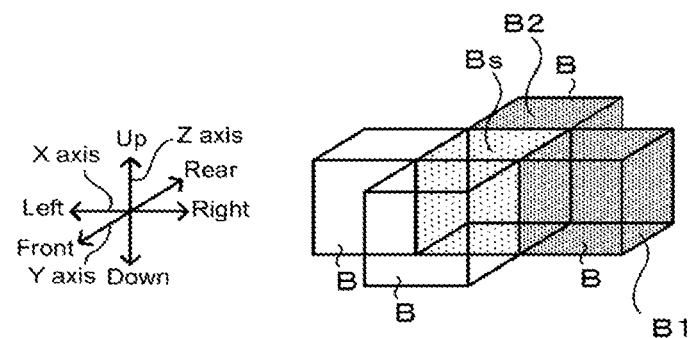
FIG. 10B illustrates first and second blocks B1 and B2 when the target position T is in the right rear zone a4.

Next, CPU 71 sets first and second blocks B1 and B2 (S220). Here, CPU 71 sets first and second blocks B1 and B2 from blocks B that are contiguous with specific block Bs. Specifically, as illustrated in FIG. 7A, specific block Bs is divided into four zones of left front zone a1, right front zone a2, left rear zone a3, and right rear zone a4. CPU 71 recognizes which zone includes target position T and sets blocks that are individually contiguous with two external surfaces of the recognized zone as first and second blocks B1 and B2. For example, in FIG. 7A, left front zone a1 includes target position T. In this case, as illustrated in FIG. 7B, in four blocks that are contiguous individually with front, rear, left and right external surfaces of specific block Bs, the left and front blocks that are contiguous individually with two external surfaces (refer to thick solid lines in FIG. 7A) of left front zone a1 are set as first and second blocks B1 and B2. Additionally, in FIG. 8A, right front zone a2 includes target position T. In this case, as illustrated in FIG. 8B, the right and front blocks that are contiguous individually with two external surfaces (refer to thick solid lines in FIG. 8A) of right front zone a2 are set as first and second blocks B1 and B2. In FIG. 9A, left rear zone a3 includes target position T. In this case, as illustrated in FIG. 9B, the left and rear blocks that are contiguous individually with two external surfaces (refer to thick solid lines in FIG. 9A) of left rear zone a3 are set as first and second blocks B1 and B2. In FIG. 10A, right rear zone a4 includes target position T. In this case, as illustrated in FIG. 10B, the right and rear blocks that are contiguous individually with two external surfaces (refer to thick solid lines in FIG. 10A) of right rear zone a4 are set as first and second blocks B1 and B2.

Next, CPU 71 calculates correction amounts $\Delta x_t$ and $\Delta y_t$ of target position T in the X- and Y-directions (S230). Here, CPU71 calculates correction amounts $\Delta x_t$ and $\Delta y_t$ in the X- and Y-directions of target position T without taking the amount of deviation of target position T in a Z-direction into consideration.

Figure 11:
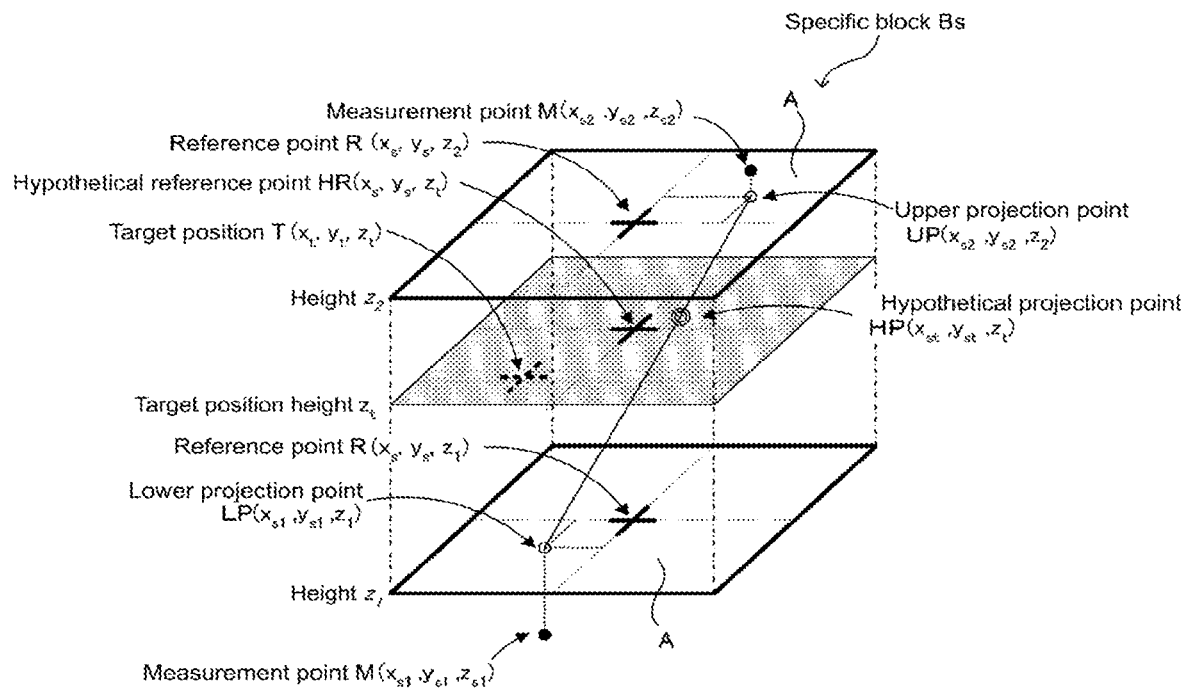
FIG. 11 illustrates how to obtain a hypothetical projection point HP of specific block Bs.

Specifically, firstly, CPU71 obtains a hypothetical projection point HP on an XY-plane at target position height $z_t$ for each of specific block Bs, first and second blocks B1 and B2. As an example, a method for obtaining hypothetical projection point HP of specific block Bs will be described by reference to FIG. 11. Specific block Bs includes a pair of upper and lower areas A. It is assumed that a height of lower area A is $z_1$ and a height of upper area A is $z_2$. Measurement point M $(x_{s1}, y_{s1}, z_{s1})$ of reference point R $(x_s, y_s, z_1)$ in lower area A resides in a position deviating by the measured deviation amount from reference point R thereof. A point (xs1, ys1, z1) where this measurement point M (xs1, ys1, zs1) is projected onto lower area A is referred to as lower projection point LP. Lower projection point LP can be referred to as a measurement point that does not take the amount of deviation in the Z-direction into consideration. On the other hand, measurement point M $(x_{s2}, y_{s2}, z_{s2})$ of reference point R $(x_s, y_s, z_2)$ in upper area A resides in a position deviating by the measured deviation amount from reference point R thereof. A point $(x_{s2}, y_{s2}, z_2)$ where this measurement point M $(x_{s2}, y_{s2}, z_{s2})$ is projected onto upper area A is referred to as upper projection point UP. Upper projection point UP can be referred to as a measurement point that does not take the amount of deviation in the Z-direction into consideration.

Then, an intersection point is obtained mathematically, the intersection point being where a straight line connecting lower projection point LP with upper projection point UP intersects an XY-plane (a shaded plane in FIG. 11) of target position height $z_t$. This intersection point constitutes a hypothetical projection point HP $(x_{st}, y_{st}, z_t)$ on the XY-plane of the height $z_t$ in specific block Bs. Hypothetical projection point HP $(x_{st}, y_{st}, z_t)$ can be referred to as a point where hypothetical measurement point HM $(x_{st}, y_{st}, z_{st})$, not illustrated, of hypothetical reference point R $(x_s, y_s, z_t)$ on the XY-plane of height $z_t$ is projected on the XY-plane of height $z_t$. Hypothetical projection points HP of first and second blocks B1 and B2 are also obtained similarly.

Following this, correction amounts $\Delta x_t$ and $\Delta y_t$ in the X- and Y-directions of target position T are calculated based on a straight line connecting together hypothetical projection point HP of specific block Bs (referred to as HPs) and hypothetical projection point of first block B1 (referred to as HP1) and a straight line connecting together hypothetical projection point HPs of specific block Bs and hypothetical projection point HP of second block B2 (referred to as HP2). Hereinafter, hypothetical reference points HR of specific block Bs, first block B1 and second block B2 are referred to as HRs, HR1, and HR2, respectively. Coordinates of hypothetical reference points HRs, HR1, and HR2 and hypothetical projection points HPs, HP1, and HP2 have already been defined as described above.

Figure 12:
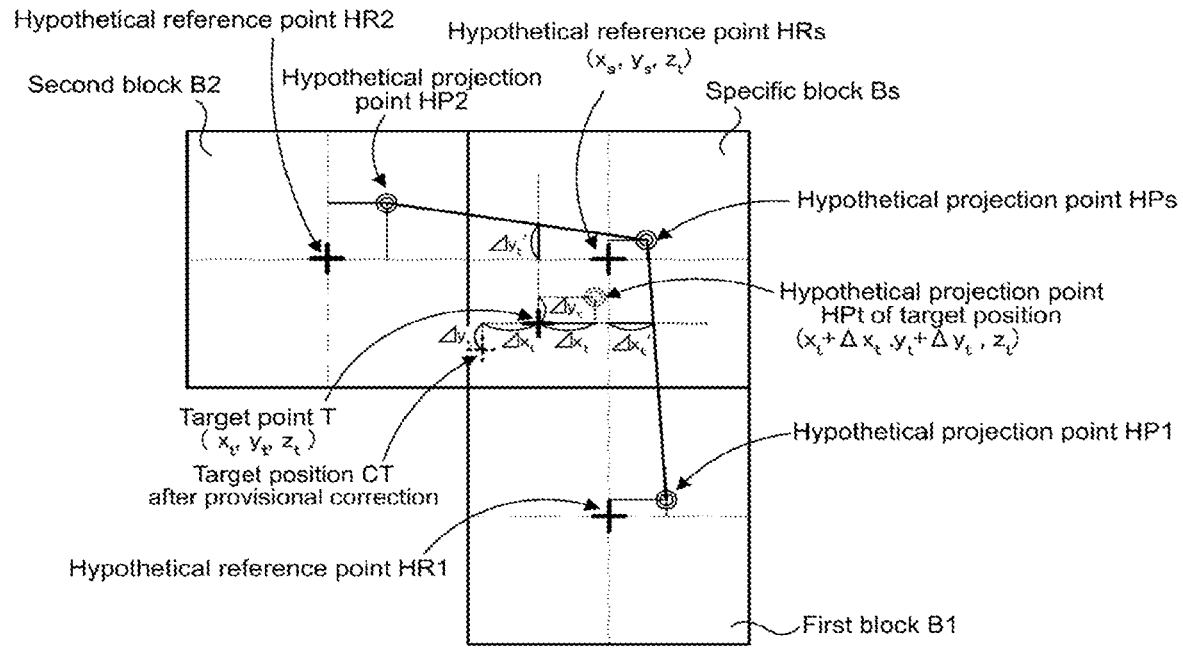
FIG. 12 illustrates a calculation method of correction amounts $\Delta xt$, $\Delta yt$.

A method for calculating correction amounts $\Delta x_t$, $\Delta y_t$ will be described by reference to FIG. 12. Correction amount $\Delta x_t$ is obtained as follows. Firstly, an x-coordinate with a y-coordinate being $y_t$ is obtained from an equation (an equation of x and y) of a straight line connecting together two hypothetical projection points HPs, HP1 and $y_t$ which constitutes a y-coordinate of target position T. Then, a difference $\Delta x_t$, between the x-coordinate so obtained and an x-coordinate (=xs) of reference point Rs of specific block Bs is obtained. Next, an equation of a straight line connecting the following two points is obtained. One point is a point where a horizontal axis is an x-coordinate (=$x_s$) of hypothetical reference point HRs and a vertical axis is a difference between an x-coordinate of hypothetical projection point HPs and an x-coordinate of hypothetical reference point HRs. The other point is a point where a horizontal axis is an x-coordinate of hypothetical reference point HR2 and a vertical axis is a difference between an x-coordinate of hypothetical projection point HP2 and an x-coordinate of hypothetical reference point HR2. A value (a difference in the x-direction) of a vertical axis with a horizontal axis being the x-coordinate (=$x_t$) of target position T is obtained from the equation obtained. Correction amount $\Delta x_t$ in the x-direction at the target position is obtained by multiplying a value obtained by dividing the obtained difference in the x-direction by the difference in the x-direction at hypothetical reference point HRs by difference $\Delta x_t$.

Correction amount $\Delta y_t$ is also obtained in a similar manner. Firstly, a y-coordinate with an x-coordinate being $x_t$ is obtained from an equation (an equation of x and y) of a straight line connecting together two hypothetical projection points HPs, HP2 and $x_t$ which constitutes an x-coordinate of target position T, and a difference $\Delta y_t$, between the y-coordinate so obtained and a y-coordinate (=$y_s$) of reference point Rs of specific block Bs is obtained. Next, an equation of a straight line connecting the following two points is obtained. One point is a point where a horizontal axis is a y-coordinate (=$y_s$) of hypothetical reference point HRs and a vertical axis is a difference between a y-coordinate of hypothetical projection point HPs and a y-coordinate of hypothetical reference point HRs. The other point is a point where a horizontal axis is a y-coordinate of hypothetical reference point HR2 and a vertical axis is a difference between a y-coordinate of hypothetical projection point HP2 and a y-coordinate of hypothetical reference point HR2. A value (a difference in the y-direction) of a vertical axis with a horizontal axis being the y-coordinate (=$y_t$) of target position T is obtained from the equation obtained. Correction amount $\Delta y_t$ in the y-direction at the target position is obtained by multiplying a value obtained by dividing the obtained difference in the y-direction by the difference in the y-direction at hypothetical reference point HRs by difference $\Delta y_t$. In FIG. 12, target position CT after a provisional correction is shown by a dotted "+". Target position CT after the provisional correction is a post-correction target position obtained provisionally without taking a deviation in the Z-direction into consideration and is $(x_t-\Delta x_t, y_t-\Delta y_t, z_t)$.

Returning to FIG. 6, after S230, CPU 71 calculates a correction amount $\Delta z_t$ of target position T in the Z-direction (S240). Here, CPU 71 obtains an inclined plane corresponding to the XY-plane of target position height $z_t$ and calculates a correction amount $\Delta z_t$ of the target position in the Z-direction after correction based on the inclined plane so obtained.

Specifically, firstly, CPU 71 obtains hypothetical measurement point HM corresponding to hypothetical reference point HR on the XY-plane of target position height $z_t$ for each of specific block Bs, first and second blocks B1 and B2. Hypothetical measurement point HM constitutes a stopping position (an estimated value) of the distal end of end effector 23 when robot 20 is controlled so that the distal end of end effector 23 temporarily coincides with the coordinates of hypothetical reference point HR.

Figure 13:
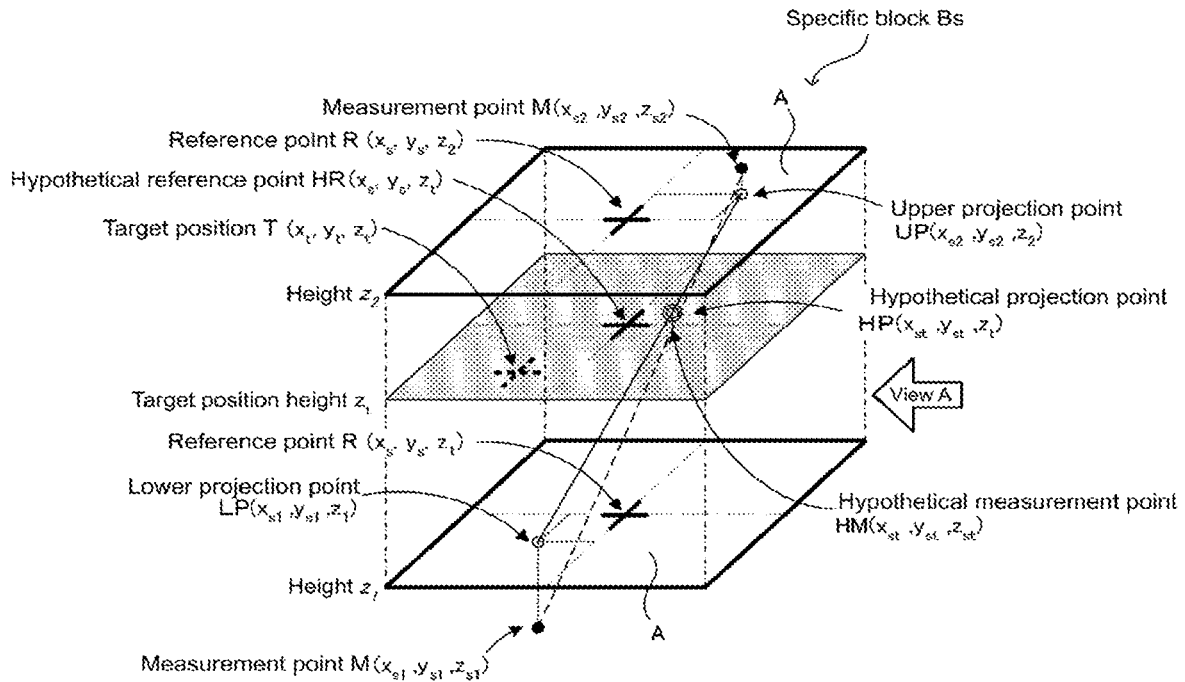
FIG. 13 illustrates how to obtain a hypothetical measurement point HM of specific block Bs.
Figure 14:
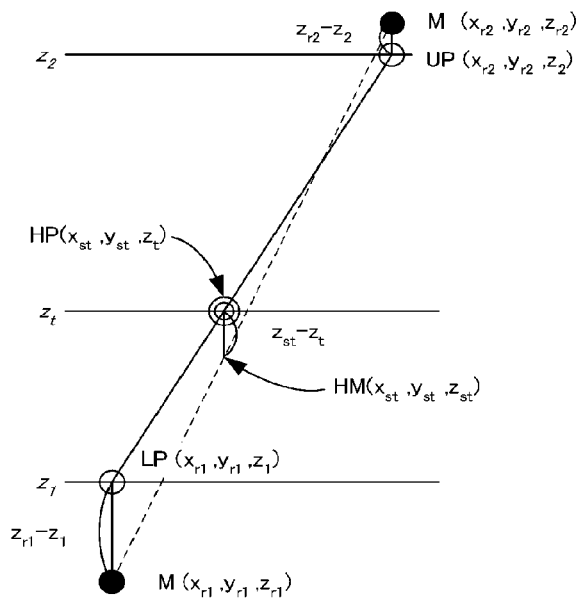
FIG. 14 is a view of FIG. 13 as viewed from a direction indicated by an arrow A illustrated therein.

As an example, referring to FIG. 13, a method for obtaining hypothetical measurement point HM of specific block Bs will be described. Points and positions illustrated in FIG. 13 are the same as the points and the positions illustrated in FIG. 11. Here, measurement point M $(x_{s1}, y_{s1}, z_{s1})$ of lower area A and measurement point M $(x_{s2}, y_{s2}, z_{s2})$ of upper area A are connected together. FIG. 14 illustrates this state as viewed from a direction indicated by a white arrow (a direction indicated by arrow A) illustrated FIG. 13. In a graph in which a horizontal axis represents a z-coordinate and a vertical axis represents the amount of deviation in the Z-direction, an equation of a straight line is obtained, the straight line connecting together a point of which a z-coordinate is $z_1$ and the deviation amount is $(z_{r1}-z_1)$ and a point of which a z-coordinate is z2 and the deviation amount is $(z_{r2}-z_2)$. The deviation amount, that is, $(z_{st}-z_t)$ with the Z-coordinate being $z_t$ is obtained from the equation so obtained. As a result, hypothetical measurement point HM can be obtained. Hypothetical measurement points HM of first and second blocks B1 and B2 are obtained in a similar manner.

Figure 15:
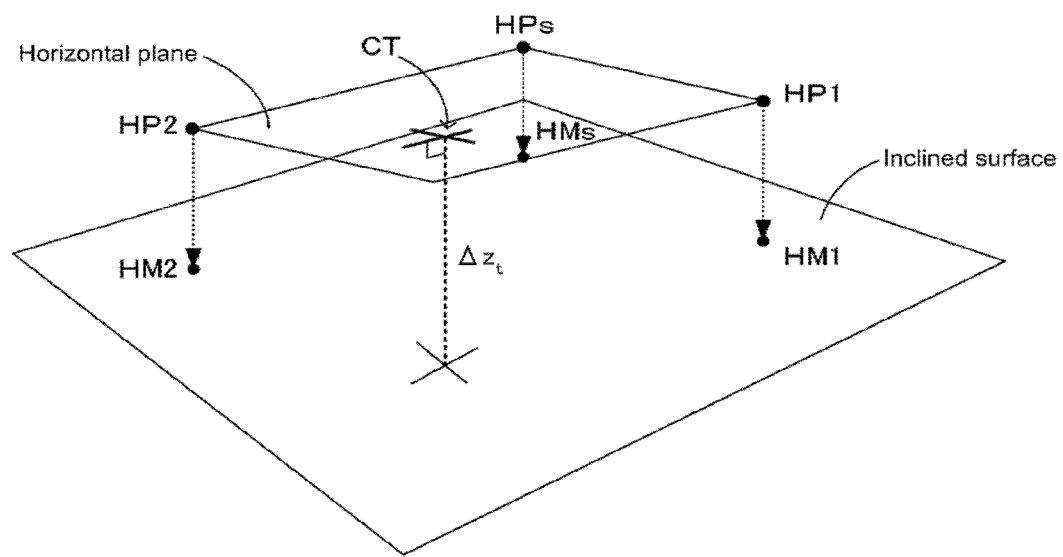
FIG. 15 illustrates an inclined plane including hypothetical measurement points HMs, HM1, and HM2.

Following this, as illustrated in FIG. 15, an equation of an inclined plane (a horizontal plane in some situations) including hypothetical measurement point HM of specific block Bs (referred to as HMs), hypothetical measurement point HM of first block B1 (referred to as HM1), and hypothetical measurement point HM of second block (referred to as HM2) obtained mathematically. Then, the values of x and y in the aforesaid target position CT $(x_t-\Delta x_t, y_t-\Delta y_t, z_t)$ after provisional correction are substituted in the equation of the inclined plane, and a value of the z-coordinate then is obtained, whereby a correction amount $\Delta z_t$ in the Z-direction is obtained.

Returning to FIG. 6, after S240, CPU71 calculates target position AT $(x_t-\Delta x_t, y_t-\Delta y_t, z-\Delta z_t)$ after a final correction (S250) and ends the routine. As a result, when target position T is input into robot system 10, FCU 71 controls robot 20 so that the distal end of end effector 23 coincides with target position AT after correction. As a result, the distal end of end effector 23 coincides with target position T on the world coordinates with good accuracy.

In an embodiment described above, target position T is corrected by making use of not only the measured deviation amount from reference point R (the difference between the measurement point M and reference point R) of specific block Bs but also the measured amounts of deviation from reference points R of first and second blocks B1 and B2 that are contiguous with specific block Bs. Therefore, the distal end of end effector 23 can be positioned in target position T designated in the operation space of three-dimensional matrix 25.

In the four blocks surrounding specific block Bs, the two blocks residing near target position T are set as the first and second blocks. Due to this, target position T can be corrected more appropriately.

Further, in the embodiment that has been described heretofore, the correction amounts in the X-direction and Y-direction of target position T without taking the amount of deviation in the Z-direction into consideration, whereafter the inclined plane corresponding to the XY-plane of target position height $z_t$ is obtained while taking the amount of deviation in the Z-direction into consideration, whereby the correction amount in the Z-direction of the target position is obtained based on the inclined plane so obtained. Therefore, compared with a case where the correction amounts in the X-, Y-, and Z-directions are obtained together at one time, the correction amounts in the individual directions can easily be obtained.

Furthermore, in the present embodiment described above, the correction amounts in the X-direction and Y-direction of target position T are obtained based on the straight line connecting together hypothetical projection point HPs of specific block Bs and hypothetical projection point HP1 of first block B1 and the straight line connecting together hypothetical projection point HPs of specific block Bs and hypothetical projection point HP2 of second block B2. Therefore, the correction amounts in the X-direction and Y-direction of target position T can be obtained relatively easily.

Further, in the embodiment described above, the deviation amount at target position height $z_t$ is obtained for each of specific block Bs, first block B1 and second block B2 by use of the straight line connecting together upper projection position UP and lower projection position LP and the straight line connecting together upper measurement point M and lower measurement point M. Then, the inclined plane is obtained based on the respective deviation amounts at target position height $z_t$ of specific block Bs, first block B1 and second block B2. Therefore, the correction amount in the Z-direction of target position T can be obtained relatively easily.

The present disclosure is not limited to the embodiment described above, and needless to say, the present disclosure can be carried out in various forms as long as the forms belong to the technical scope of the present disclosure.

For example, while a vertical articulated robot is described as functioning as robot 20 in the embodiment described above, the configuration is not limited thereto. For example, an orthogonal robot, a horizontal articulated robot, a parallel link robot, or the like may be adopted as robot 20. However, the target position correction method of the present disclosure is suitable for application to the case where a vertical articulated robot is used as robot 20.

In the embodiment described above, in the four blocks that are individually contiguous with the front, rear, left, and right surfaces of specific block Bs, the two blocks are set as the first and second blocks; however, the configuration is not particularly thereto. For example, two blocks in four blocks that are individually contiguous with upper, lower, front, and rear surfaces of specific block Bs may be set as the first and second blocks. Alternatively, two blocks in four blocks that are individually contiguous with upper, lower, left, and right surfaces of specific block Bs may be set as the first and second blocks. Also in these cases, in the four blocks surrounding specific block Bs, the two blocks residing near target position T are preferably set as the first and second blocks.

In the embodiment described above, in the four blocks that are contiguous with specific block Bs, the two blocks residing near target position T are set as the first and second blocks; however, in the case where two or three blocks are contiguous with specific block Bs, the first and second block may be set without using this method. For example, in the case where there are only two blocks that are contiguous with specific block Bs, such as in the case where specific block Bs resides in a corner of three-dimensional matrix 25, those two blocks should be set as the first and second blocks.

The method for correcting a target position of a work robot according to the present disclosure may be configured as follows.

In the method for correcting a target position of a work robot of the present disclosure, in the step (a), a front block, a rear block, a left block, and a right block are respectively contiguous with the front, rear, left and right surfaces of the specific block, and two blocks may be selected from the front block, the rear block, the left block and the right block based on the target position as the first and second blocks. In this case, in the step (a), the specific block may be divided into four zones to form a left front zone, a right front zone, a left rear zone, and a right rear zone, a zone including the target position may be selected from the four zones, and blocks that are individually contiguous with two external surfaces of the selected zone may be set as the first and second blocks. As a result, in the four blocks surrounding the specific block, the two blocks residing near the target position are set as the first and second blocks. Therefore, the target position can be corrected more appropriately.

In the method for correcting a target position of a work robot according to the present disclosure, in the step (b), firstly, correction amounts in the X-direction and the Y-direction of the target position may be obtained without taking the amount of deviation in the Z-direction into consideration, and then, an inclined plane (including the case of a horizontal plane) corresponding to an XY-plane including a Z-coordinate of the target position may be obtained by taking the amount of deviation in the Z-direction into consideration, so that a correction amount in the Z-direction of the target position may be obtained based on the inclined plane. As a result, compared with a case where correction amounts in the X-, Y-, and Z-directions are both obtained at one time, the correction amounts in the individual directions can easily be obtained.

In the step (b), in obtaining correction amounts in the X-direction and the Y-direction of the target position without taking the amount of deviation in the Z-direction, an intersection point where a straight line connecting together an upper projection position where a position deviating by the measured deviation amount from the reference point in the upper area is projected and a lower projection position where a position deviating by the measured deviation amount from the reference point in the lower area is projected intersects an XY-plane including a Z-coordinate of the target position may be obtained for each of the specific block, the first block, and the second block, and correction amounts in the X-direction and the Y-direction of the target position may be obtained based on a straight line connecting together the intersection point of the specific block and the intersection point of the first block and a straight line connecting together the intersection point of the specific block and the intersection point of the second block. As a result, the correction amounts of the target position in the X-direction and the Y-direction can be obtained relatively easily.

In the step (b), in obtaining the inclined plane for use in obtaining a correction amount in the Z-direction of the target position by taking the amount of deviation in the Z-direction into consideration, the amount of deviation of the target position on a Z-coordinate may be obtained by use of a straight line connecting together the upper projection position and the lower projection position and a straight line connecting together a position deviating by the measured deviation amount from the reference point in the upper area and a position deviating by the measured deviation amount from the reference point in the lower area for each of the specific block, the first block, and the second block, and the inclined plane may be obtained based on the deviation amounts on the Z-coordinate of the target position of the specific block, the first block, and the second block. As a result, the correction amount of the target position in the Z-direction can be obtained relatively easily.

INDUSTRIAL APPLICABILITY

The present disclosure can be applied to an industrial machine or the like where components are assembled together by making use of a work robot.

REFERENCE SIGNS LIST

10: robot system; 20: robot; 22: arm; 23: end effector; 25: three-dimensional matrix; 31 to 36: first to sixth links; 41 to 45: first to fifth joints; 51 to 55: first to fifth motors; 61 to 65: first to fifth encoders; 70: control device; 71: CPU; 72: ROM; 73: HDD; 74: RAM; 75: drive circuit; 76: input device; 77: output device; A: area; a1: left front zone; a2: right front zone; a3: left rear zone; a4: right rear zone; AT: target position after correction; B: block; B1: first block; B2: second block; Bs: specific block; CT: target position after provisional correction; HM: hypothetical measurement point; HP: hypothetical projection point; HR: hypothetical reference point; LP: lower projection point; M: measurement point; R: reference point; T: target position; UP: upper projection point

The invention claimed is:

1. A method for correcting a target position of a work robot in which with a left-right direction referred to as an X-axis, a front-rear direction referred to as a Y-axis, and an up-down direction referred to as a Z-axis, matrix planes each formed by continuously connecting, together in X- and Y-directions, quadrangular areas being parallel to an XY-plane and each having a reference point are piled up one on another at predetermined intervals in a Z-direction to thereby build up a three-dimensional matrix, and a target position of the work robot designated in an operation space of the three-dimensional matrix is corrected, a rectangular parallelepiped space including an upper and lower pair of the areas disposed at the predetermined intervals being referred to as a block, and a block including the target position designated in the operation space of the three-dimensional matrix being referred to as a specific block, the method comprising:

(a) a step of setting two blocks contiguous with the specific block as a first block and a second block; and (b) a step of correcting the target position based on respective reference points in an upper area and a lower area of the specific block and a measured deviation amount of the work robot from the reference points, respective reference points in an upper area and a lower area of the first block and a measured deviation amount of the work robot from the reference points, and respective reference points in an upper area and a lower arear of the second block and a measured deviation amount of the work robot from the reference points.

2. The method for correcting a target position of a work robot according to claim 1,
wherein in the step (a), a front block, a rear block, a left block, and a right block are respectively contiguous with front, rear, left and right surfaces of the specific block, and two blocks are selected as the first and second blocks from the front block, the rear block, the left block, and the right block based on the target position.

3. The method for correcting a target position of a work robot according to claim 2,
wherein in the step (a), the specific block is divided into four zones to form a left front zone, a right front zone, a left rear zone, and a right rear zone, a zone including the target position is selected from the four zones, and blocks that are individually contiguous with two external surfaces of the selected zone are set as first and second blocks.

4. The method for correcting a target position of a work robot according to claim 1,
wherein in the step (b), firstly, correction amounts in an X-direction and a Y-direction of the target position are obtained without taking an amount of deviation in a Z-direction into consideration, then, an inclined plane, inclusive of a horizontal plane, corresponding to an XY-plane including a Z-coordinate of the target position is obtained by taking an amount of deviation in the Z-direction into consideration, and a correction amount in the Z-direction of the target position is obtained based on the inclined plane.

5. The method for correcting a target position of a work robot according to claim 4,
wherein in the step (b), in obtaining correction amounts in the X-direction and the Y-direction of the target position without taking the amount of deviation in the Z-direction, an intersection point where a straight line connecting together an upper projection position where a position deviating by the measured deviation amount from the reference point in the upper area is projected and a lower projection position where a position deviating by the measured deviation amount from the reference point in the lower area is projected intersects an XY-plane including a Z-coordinate of the target position is obtained for each of the specific block, the first block, and the second block, and correction amounts in the X-direction and the Y-direction of the target position are obtained based on a straight line connecting together the intersection point of the specific block and the intersection point of the first block and a straight line connecting together the intersection point of the specific block and the intersection point of the second block.

6. The method for correcting a target position of a work robot according to claim 4,
wherein in the step (b), in obtaining the inclined plane for use in obtaining a correction amount in the Z-direction of the target position by taking the amount of deviation in the Z-direction into consideration, an amount of deviation of the target position on a Z-coordinate is obtained by use of a straight line connecting together the upper projection position and the lower projection position and a straight line connecting together a position deviating by the measured deviation amount from the reference point in the upper area and a position deviating by the measured deviation amount from the reference point in the lower area for each of the specific block, the first block, and the second block, and the inclined plane is obtained based on the deviation amount on the Z-coordinate of the target position for each of the specific block, the first block, and the second block.

* * * * *